(12) United States Patent
Maeda

(10) Patent No.: US 9,601,726 B2
(45) Date of Patent: Mar. 21, 2017

(54) SEALING MATERIAL FOR SECONDARY BATTERY AND SEALING MATERIAL COMPOSITION FOR SECONDARY BATTERY

(71) Applicant: ZEON CORPORATION, Tokyo (JP)

(72) Inventor: Kouichirou Maeda, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 90 days.

(21) Appl. No.: 14/416,875

(22) PCT Filed: Sep. 5, 2013

(86) PCT No.: PCT/JP2013/073866
§ 371 (c)(1),
(2) Date: Jan. 23, 2015

(87) PCT Pub. No.: WO2014/042059
PCT Pub. Date: Mar. 20, 2014

(65) Prior Publication Data
US 2015/0188099 A1 Jul. 2, 2015

(30) Foreign Application Priority Data

Sep. 11, 2012 (JP) ................................. 2012-199772

(51) Int. Cl.
| | | |
|---|---|---|
| C08L 9/00 | (2006.01) |
| C08L 25/10 | (2006.01) |
| H01M 2/08 | (2006.01) |
| C08L 47/00 | (2006.01) |
| C08L 65/00 | (2006.01) |
| H01M 10/052 | (2010.01) |
| C09D 145/00 | (2006.01) |
| C09K 3/10 | (2006.01) |

(52) U.S. Cl.
CPC ............... H01M 2/08 (2013.01); C08L 9/00 (2013.01); C08L 47/00 (2013.01); C08L 65/00 (2013.01); C09D 145/00 (2013.01); C09K 3/1006 (2013.01); H01M 10/052 (2013.01); C08G 2261/3325 (2013.01); C08G 2261/418 (2013.01); C09K 2200/0617 (2013.01)

(58) Field of Classification Search
CPC .......... C09K 3/1006; C09K 2200/0617; C08L 65/00; C08L 9/00; C08L 47/00; C08L 45/00; C08L 83/04; H01M 2/08
See application file for complete search history.

(56) References Cited

U.S. PATENT DOCUMENTS

| | | | |
|---|---|---|---|
| 5,306,582 A | 4/1994 | Tanaka | |
| 5,360,685 A | 11/1994 | Tanaka | |
| 5,837,398 A * | 11/1998 | Adams | H01M 2/08 |
| | | | 429/174 |
| 2008/0033112 A1* | 2/2008 | Squire | C08L 23/0823 |
| | | | 525/240 |
| 2010/0059113 A1 | 3/2010 | Hasegawa et al. | |

FOREIGN PATENT DOCUMENTS

| | | |
|---|---|---|
| JP | S53-84122 A | 7/1978 |
| JP | S55-16352 A | 2/1980 |
| JP | S55-30148 A | 3/1980 |
| JP | S56-32671 A | 4/1981 |
| JP | S56-32672 A | 4/1981 |
| JP | S58-10365 A | 1/1983 |
| JP | S59-91660 A | 5/1984 |
| JP | S59-112565 A | 6/1984 |
| JP | S64-40469 A | 2/1989 |
| JP | H06-5270 A | 1/1994 |
| JP | H06-124694 A | 5/1994 |
| JP | H11-40118 A | 2/1999 |
| JP | 2000-243359 A | 9/2000 |
| JP | 2002-343313 A | 11/2002 |
| JP | 2002343313 A * | 11/2002 |
| JP | 2008-140759 A | 6/2008 |

OTHER PUBLICATIONS

The machine translation; JP 2002-343313 A; Yamashita et al; Nov. 2002.*
International Preliminary Report on Patentability and Translation of Written Opinion of the International Searching Authority; PCT/JP2013/073866; issued on Mar. 17, 2015.
International Search Report; PCT/JP2013/073866; Oct. 8, 2013.

* cited by examiner

*Primary Examiner* — Karuna P Reddy
(74) *Attorney, Agent, or Firm* — Studebaker & Brackett PC

(57) ABSTRACT

A sealing material for secondary battery contains a conjugated diene-based polymer and a cyclic olefin-based polymer. The weight ratio between the conjugated diene-based polymer and the cyclic olefin-based polymer, as expressed in (conjugated diene-based polymer/cyclic olefin-based polymer), ranges from 40/60 to 80/20, and the total amount of the diene-based polymer and the cyclic olefin-based polymer is 80 wt % or more of an entire amount.

4 Claims, No Drawings

SEALING MATERIAL FOR SECONDARY BATTERY AND SEALING MATERIAL COMPOSITION FOR SECONDARY BATTERY

TECHNICAL FIELD

The present invention relates to a sealing material for secondary battery and a sealing material composition for secondary battery that can form a sealing material layer having high heat resistance.

BACKGROUND ART

Small-sized electronic devices, such as notebook-type personal computers, mobile phones, personal data assistants (PDAs), and the like, often use lithium ion secondary batteries as the power supplies. Furthermore, in recent years, lithium ion secondary batteries are also used in automobile applications. As the use of lithium ion secondary batteries becomes more widespread, requirements for performance and safety of a lithium ion secondary battery (hereinafter also referred to simply as battery) are increasing. Then this kind of batteries are usually used repeatedly by charging and discharging, which may cause an electrolyte solution to leak out by rising a pressure inside the battery as a result of volume change of an electrode and heat generation due to a repeat of charging and discharging operations. In such a case, not only deterioration occurs in battery characteristics, but a problem also exists on a hazard such as firing and corrosion of the device. For example, when the electrolyte solution is used for a lithium ion secondary battery, since electrolyte solution is organic-based, and thus it dislikes water extremely, this type of lithium ion secondary battery is required to have high sealing performance such that water is completely prevented from entering inside of the battery, and electrolyte solution is also completely prevented from leaking out.

For example, a lithium ion secondary battery includes a metal housing to seal a power generation element thereof, and electrical insulation is required between a positive electrode terminal and a negative electrode terminal in order to prevent short circuiting between the positive electrode and the negative electrode. For electrical insulation between the positive and the negative electrodes, and for sealing, a gasket made of electrically insulating material is usually used on an opening of the metal housing that houses the power generation element. As the electrically insulating material, an electrically insulating gasket made of resin is known to be used (see, e.g., Patent Literature 1).

In order to improve the sealing by such an insulating gasket, use in combination of an insulating gasket and a sealing material is also suggested (see, e.g., Patent Literatures 2 to 4, etc.). The sealing material is applied on the insulating gasket or on the metal housing, and the insulating gasket is then attached to the metal housing, leading to improving the sealing performance between the insulating gasket and the metal housing.

Examples of such a sealing material include pitch-based materials, such as coal tar, asphalt, etc., as well as materials obtained by adding a polymer as a modifier to a pitch-based material (see, e.g., Patent Literatures 5 to 9, etc.). In addition, examples other than pitch-based materials include butyl rubber (see, e.g., Patent Literature 10, etc.), polyolefin-based adhesive (see, e.g., Patent Literature 11, etc.), polyvinylidene fluoride resin (see, e.g., Patent Literature 12, etc.), and the like.

CITATION LIST

Patent Literature

Patent Literature 1: JP 53-084122 A
Patent Literature 2: JP 55-030148 A
Patent Literature 3: JP 55-016352 A
Patent Literature 4: JP 59-112565 A
Patent Literature 5: JP 56-032671 A
Patent Literature 6: JP 58-010365 A
Patent Literature 7: JP 59-091660 A
Patent Literature 8: JP 06-124694 A
Patent Literature 9: JP 06-005270 A
Patent Literature 10: JP 55-030148 A
Patent Literature 11: JP 56-032672 A
Patent Literature 12: JP 01-040469 A

SUMMARY OF INVENTION

Technical Problem

Incidentally, when a solder reflow process of a predetermined profile is performed for mounting a secondary battery on a circuit board or the like, a sealing material layer formed of a sealing material needs to have heat resistance.

An object of the present invention is to provide a sealing material for secondary battery and a sealing material composition for secondary battery that can form a sealing material layer having high heat resistance.

Solution to Problem

After extensive studies, the present inventor has discovered that the object described above can be achieved by inclusion of a predetermined hydrogenated polymer and a conjugated diene-based polymer, leading to completion of the present invention.

That is, according to the present invention, there are provided (1) A sealing material for secondary battery including: a conjugated diene-based polymer; and a cyclic olefin-based polymer, wherein a weight ratio between the conjugated diene-based polymer and the cyclic olefin-based polymer, as expressed in (conjugated diene-based polymer/cyclic olefin-based polymer), ranges from 40/60 to 80/20, and a total amount of the diene-based polymer and the cyclic olefin-based polymer is 80 wt % or more of an entire amount, (2) The sealing material for secondary battery according to (1), wherein the cyclic olefin-based polymer is a polymer obtained by metathesis polymerization, and has a cyclic structure in a main chain, (3) The sealing material for secondary battery according to (1) or (2), wherein a glass transition temperature of the conjugated diene-based polymer is −30° C. or lower, and a thermal deformation temperature of the cyclic olefin-based polymer is 80° C. or higher, (4) The sealing material for secondary battery according to any of (1) to (3) further including: a nonionic surfactant, and (5) A sealing material composition for secondary battery including: the sealing material for secondary battery according to any of (1) to (4); and an organic liquid material, wherein the sealing material for secondary battery is contained in an amount of 1 to 30 wt % relative to the organic liquid material.

Advantageous Effects of Invention

By using a sealing material for secondary battery and a sealing material composition for secondary battery according to the present invention, a sealing material layer having high heat resistance can be formed.

DESCRIPTION OF EMBODIMENTS

A sealing material for secondary battery according to an exemplary embodiment of the present invention of the present invention will be described below. A sealing material for secondary battery according to the present invention contains a conjugated diene-based polymer and a cyclic olefin-based polymer, wherein a weight ratio between the conjugated diene-based polymer and the cyclic olefin-based polymer, as expressed in (conjugated diene-based polymer/ cyclic olefin-based polymer), ranges from 40/60 to 80/20, and a total amount of the diene-based polymer and the cyclic olefin-based polymer is 80 wt % or more of an entire amount.

(Conjugated Diene-Based Polymer)

A conjugated diene-based polymer used in a sealing material for secondary battery of the present invention is not particularly limited as long as the conjugated diene-based polymer is a polymer containing a conjugated diene monomer unit obtained by polymerization of a diene-based monomer. However, at least one type selected from the group consisting of conjugated diene homopolymer and conjugated diene-based copolymer is preferably used.

All that is required of a conjugated diene homopolymer is that a polymer obtained by polymerization of only a diene-based monomer, and one commonly used in industrial applications can be used without specific limitations. Examples of a diene-based monomer that forms a conjugated diene monomer unit of the conjugated diene homopolymer include, for example, 1,3-butadiene, isoprene, 2,3-dimethyl-1,3-butadiene, 1,3-pentadiene, 1,3-hexadienechloroprene, cyanobutadiene, etc. Among these, 1,3-butadiene and isoprene are preferred, and 1,3-butadiene is more preferred. The diene-based monomers may be used alone, or may be used in combination of two or more thereof.

Specific examples of the conjugated diene homopolymer include polybutadiene, polyisoprene, polychloroprene, polycyanobutadiene, polypentadiene, etc. Among these, polybutadiene and polyisoprene are preferred, and polybutadiene is more preferred. The polymerization pattern of the conjugated diene homopolymer is by no means limited, and may be selected as appropriate depending on the intended use. Also, the method for producing the conjugated diene homopolymer is not particularly limited, which may be produced by a publicly known method.

Also, the conjugated diene-based copolymer is not particularly limited as long as the conjugated diene-based copolymer is a copolymer that contains at least a conjugated diene monomer unit. One similar to the conjugated diene homopolymer described above may be used as the diene-based monomer that forms the conjugated diene monomer unit of the conjugated diene-based copolymer.

Also, a monomer that forms a monomer unit other than the conjugated diene monomer unit of the conjugated diene-based copolymer is not particularly limited as long as that monomer is polymerizable with the diene-based monomer. Examples of such a monomer include cyano group-containing vinyl monomers, amino group-containing vinyl monomers, pyridyl group-containing vinyl monomers, alkoxyl group-containing vinyl monomers, aromatic vinyl monomers, etc. Among these, cyano group-containing vinyl monomers and aromatic vinyl monomers are preferred, and aromatic vinyl monomers are more preferred. These monomers polymerizable with the diene-based monomer may be used alone, or may be used in combination of two or more thereof.

Examples of aromatic vinyl monomers include, for example, styrene, α-methyl styrene, 2-methyl styrene, 3-methyl styrene, 4-methyl styrene, 2,4-diisopropyl styrene, 2,4-dimethyl styrene, 4-t-butyl styrene, 5-t-butyl-2-methyl styrene, (N,N-dimethyl amino)ethyl styrene, (N,N-diethyl amino)ethyl styrene, etc. Among these, styrene and α-methyl styrene are particularly preferred. These aromatic vinyl monomers may be used alone, or may be used in combination of two or more thereof.

The ratio between the diene-based monomer and the monomer polymerizable with the diene-based monomer in the conjugated diene-based copolymer may be selected as appropriate depending on the intended use. The weight ratio of "conjugated diene monomer unit/unit of polymerizable monomer" ranges usually from 5/95 to 95/5, preferably from 10/90 to 90/10, and more preferably from 20/80 to 80/20.

Also, the conjugated diene-based copolymer may be either a random copolymer or a block copolymer. However, a block copolymer is preferred. The bonding pattern of a conjugated diene-based block copolymer is selected as appropriate from, for example, two-block copolymer, three-block copolymer, four-block copolymer, five-block copolymer, or the like, depending on the intended use. Specific examples of three-block copolymer include styrene-butadiene-styrene block copolymer, styrene-isoprene-styrene block copolymer, α-styrene-butadiene-α-styrene block copolymer, etc. Among these, styrene-butadine-styrene block copolymer is preferred. Note that, the method for producing the conjugated diene-based copolymer is not particularly limited, which may be produced by a publicly known method.

In the present invention, as the conjugated diene-based polymer, the conjugated diene homopolymer described above and the conjugated diene-based copolymer described above may be used alone or may be used in combination of two or more thereof, use in combination of the conjugated diene homopolymer and the conjugated diene-based copolymer is preferred.

The amount of 1,2-vinyl bond in the conjugated diene portion of the conjugated diene-based polymer used in the present invention is not particularly limited, and amount may be selected as appropriate depending on the intended use, but is usually 5 mol % or more, preferably 40 mol % or more, more preferably 60 mol % or more, and even more preferably 80 mol % or more.

The molecular weight of the conjugated diene-based polymer used in the present invention is not particularly limited, and may be selected as appropriate depending on the intended use, the weight average molecular weight measured by gel permeation chromatography (in terms of polystyrene, with a toluene eluent) ranges usually from 500 to 5,000,000, and preferably from 1,000 to 1,000,000.

Also, the molecular weight of the conjugated diene homopolymer when the conjugated diene homopolymer and the conjugated diene-based copolymer are used in combination as the conjugated diene-based polymer, expressed as a weight average molecular weight measured by gel permeation chromatography (in terms of polystyrene, with a toluene eluent), ranges usually from 500 to 500,000, preferably from 1,000 to 10,000, and more preferably from 1,000 to 5,000. Meanwhile, the molecular weight of the conjugated diene-based copolymer, expressed as a weight average molecular weight measured by gel permeation chromatography (in terms of polystyrene, with a toluene eluent), ranges usually from 1,000 to 1,000,000, preferably from 5,000 to 500,000, and more preferably from 10,000 to 300,000.

In addition, when the conjugated diene homopolymer and the conjugated diene-based copolymer are used in combination, the ratio between these polymers is not particularly limited, and may be selected as appropriate depending on the intended use, but the weight ratio of "conjugated diene homopolymer/conjugated diene-based copolymer" ranges usually from 5/95 to 90/10, preferably from 10/90 to 90/10, and more preferably from 30/70 to 80/20.

Furthermore, the glass transition temperature (Tg) of the conjugated diene-based polymer is preferably −30° C. or lower, and more preferably −65° C. or lower.

(Cyclic Olefin-Based Polymer)

A cyclic olefin-based polymer used in a sealing material for secondary battery of the present invention is either a homopolymer or a copolymer, of a cyclic olefin monomer having a cyclic structure (alicyclic or aromatic ring) formed of carbon atoms, and having a carbon-carbon double bond in the cyclic structure. The cyclic olefin-based polymer may contain a unit derived from a monomer other than the cyclic olefin monomer.

Examples of the cyclic olefin monomer include norbornene-based monomers, monocyclic cycloolefins, etc., and norbornene-based monomers are preferred. A norbornene-based monomer is a monomer containing a norbornene ring. More specifically, examples thereof include norbornenes, dicyclopentadienes, tetracyclododecenes, etc. These compounds may contain, as a substituent, a hydrocarbon group such as an alkyl group, an alkenyl group, an alkylidene group, an aryl group, etc., or a polar group such as a carboxyl group, an acid anhydride group, etc.

Examples of norbornene-based monomers without a polar group include:

dicyclopentadienes such as dicyclopentadiene, methyl dicyclopentadiene, dihydrodicyclopentadiene (also known as tricyclo[5.2.1.0$^{2,6}$]dec-8-ene), etc.;

tetracyclododecenes such as tetracyclo[6.2.1.1$^{3,6}$.0$^{2,7}$]dodec-4-ene, 9-methyl tetracyclo[6.2.1.1$^{3,6}$.0$^{2,7}$]dodec-4-ene, 9-ethyl tetracyclo[6.2.1.1$^{3,6}$.0$^{2,7}$]dodec-4-ene, 9-cyclohexyl tetracyclo[6.2.1.1$^{3,6}$.0$^{2,7}$]dodec-4-ene, 9-cyclopentyl tetracyclo[6.2.1.1$^{3,6}$.0$^{2,7}$]dodec-4-ene, 9-methylene tetracyclo[6.2.1.1$^{3,6}$.0$^{2,7}$]dodec-4-ene, 9-ethylidene tetracyclo[6.2.1.1$^{3,6}$.0$^{2,7}$]dodec-4-ene, 9-vinyl tetracyclo[6.2.1.1$^{3,6}$.0$^{2,7}$]dodec-4-ene, 9-propenyl tetracyclo[6.2.1.1$^{3,6}$.0$^{2,7}$]dodec-4-ene, 9-cyclohexenyl tetracyclo[6.2.1.1$^{3,6}$.0$^{2,7}$]dodec-4-ene, 9-cyclopentenyl tetracyclo[6.2.1.1$^{3,6}$.0$^{2,7}$]dodec-4-ene, 9-phenyl tetracyclo[6.2.1.1$^{3,6}$.0$^{2,7}$]dodec-4-ene, etc.;

norbornenes such as 2-norbornene, 5-methyl-2-norbornene, 5-ethyl-2-norbornene, 5-butyl-2-norbornene, 5-hexyl-2-norbornene, 5-decyl-2-norbornene, 5-cyclohexyl-2-norbornene, 5-cyclopentyl-2-norbornene, 5-ethylidene-2-norbornene, 5-vinyl-2-norbornene, 5-propenyl-2-norbornene, 5-cyclohexenyl-2-norbornene, 5-cyclopentenyl-2-norbornene, 5-phenyl-2-norbornene, tetracyclo[9.2.1.0$^{2,10}$.0$^{3,8}$]tetradeca-3,5,7,12-tetraene (also known as 1,4-methano-1,4,4a,9a-tetrahydro-9H-fluoren), tetracyclo[10.2.1.0$^{2,11}$.0$^{4,9}$]pentadeca-4,6,8,13-tetraene (also known as 1,4-methano-1,4,4a,9,9a,10-hexahydroanthracene), etc.;

cyclic olefins that are pentacyclic and higher cyclic compounds such as pentacyclo[6.5.1.1$^{3,6}$.0$^{2,7}$.0$^{9,13}$]pentadeca-4,10-diene, pentacyclo[9.2.1.1$^{4,7}$.0$^{2,10}$.0$^{3,8}$]pentadeca-5,12-diene, hexacyclo[6.6.1.1$^{3,6}$.1$^{10,13}$.0$^{2,7}$.0$^{9,14}$]heptadec-4-ene, etc.; and the like.

Examples of norbornene-based monomers containing a polar group include tetracyclo[6.2.1.1$^{3,6}$.0$^{2,7}$]dodec-9-ene-4-methyl carboxylate, tetracyclo[6.2.1.1$^{3,6}$.0$^{2,7}$]dodec-9-ene-4-methanol, tetracyclo[6.2.1.1$^{3,6}$.0$^{2,7}$]dodec-9-ene-4-carboxylic acid, tetracyclo[6.2.1.1$^{3,6}$.0$^{2,7}$]dodec-9-ene-4,5-dicarboxylic acid, tetracyclo[6.2.1.1$^{3,6}$.0$^{2,7}$]dodec-9-ene-4,5-dicarboxylic acid anhydride, 5-norbornene-2-methyl carboxylate, 2-methyl-5-norbornene-2-methyl carboxylate, 5-norbornen-2-yl acetate, 5-norbornene-2-methanol, 5-norbornene-2-ol, 5-norbornene-2-carbonitrile, 2-acetyl-5-norbornene, 7-oxa-2-norbornene, and the like.

Examples of monocyclic cyclic olefins include monocyclic cyclic olefins such as cyclobutene, cyclopentene, cyclooctene, cyclododecene, 1,5-cyclooctadiene, etc., and derivatives thereof each having a substituent. These cyclic olefin monomers may be used alone, or may be used in combination of two or more thereof. The addition amount of monocyclic cycloolefins and derivatives thereof is preferably 40 wt % or less, and more preferably 20 wt % or less, relative to the total amount of the cyclic olefin monomers. An addition amount above 40 wt % may result in insufficient electrolyte solution resistance of the resultant cyclic olefin polymer.

Among these, use of dicyclopentadienes is preferred, and in particular, use of dicyclopentadiene is preferred. Also, the content of monomer unit of dicyclopentadiene in the cyclic olefin-based polymer is preferably 85 wt % or more, and more preferably 95 wt % or more.

Moreover, the thermal deformation temperature of the cyclic olefin-based polymer measured according to JIS K7207 standard is 80° C. or higher, preferably 120° C. or higher, and more preferably 150° C. or higher.

A cyclic olefin-based polymer can be obtained via ring-opening metathesis polymerization of the cyclic olefin monomer using a polymerization catalyst. The kind of the polymerization catalyst is not particularly limited as long as the polymerization catalyst subjects the cyclic olefin monomer to ring-opening metathesis polymerization.

Examples of the metathesis polymerization catalyst that subjects the cyclic olefin monomer to ring-opening metathesis polymerization include complexes in each of which a plurality of ions, atoms, polyatomic ions, and/or compounds bond to a center atom, which is a transition metal atom. Examples of a transition metal atom, which is a metal in the 5th period or below in the long-form periodic table, include atoms of 5th group, 6th group, and 8th group. The atoms in each group are not particularly limited, examples of which include, for example, tantalum for 5th group atoms, molybdenum and tungsten for 6th group atoms, and ruthenium and osmium for 8th group atoms.

Among these, complexes of ruthenium and osmium, which are 8th group atoms in the long-form periodic table, are preferred, and ruthenium carbene complex is particularly preferred for the following reasons. Ruthenium carbene complex exhibits high catalytic activity, and thus achieves a high rate of ring-opening polymerization reaction of a polymerizable composition, thereby achieving high productivity. Also, a resultant resin molded article has a low odor level (odor from unreacted cyclic olefin(s)). In addition, ruthenium carbene complex is characterized as being relatively stable, and unlikely to be deactivated, with oxygen and moisture in the air.

Ruthenium carbene complex can be prepared by using the methods, for example described in Organic Letters, Vol. 1, 1999, p. 953; in Tetrahedron Letters, Vol. 40, 1999, p. 2247; etc.

Examples of ruthenium carbene complexes include:

ruthenium complex compounds in each of which a heteroatom-containing carbene compound and a neutral electron donor compound are bonded as the ligands of benzylidene(1,3-dimesityl-imidazolidin-2-ylidene) (tricyclohexyl phosphine) ruthenium dichloride, (1,3-dimesityl-imidazolidin-2-ylidene) (3-methyl-2-butene-1-ylidene) (tricyclopentyl phosphine) ruthenium dichloride, benzylidene(1,3-dimesityl-octahydro-benzimidazol-2-ylidene) (tricyclohexyl phosphine) ruthenium dichloride, benzylidene[1,3-di(1-phenylethyl)-4-imidazolin-2-ylidene](tricyclohexyl phosphine) ruthenium dichloride, benzylidene(1,3-dimesityl-2,3-dihydro-benzimidazol-2-ylidene) (tricyclohexyl phosphine) ruthenium dichloride, benzylidene(tricyclohexyl phosphine) (1,3,4-triphenyl-2,3,4,5-tetrahydro-1H-1,2,4-triazole-5-ylidene) ruthenium dichloride, (1,3-diisopropyl-hexahydro-pyrimidin-2-ylidene) (ethoxymethylene) (tricyclohexyl phosphine) ruthenium dichloride, benzylidene(1,3-dimesityl imidazolidin-2-ylidene) pyridine ruthenium dichloride, etc.;

ruthenium complex compounds in each of which two heteroatom-containing carbene compounds are bonded as the ligands of benzylidene-bis-(1,3-dicyclohexyl imidazolidin-2-ylidene) ruthenium dichloride, benzylidene-bis-(1,3-diisopropyl-4-imidazolin-2-ylidene) ruthenium dichloride, etc.; and (1,3-dimesityl imidazolidin-2-ylidene) (phenyl vinylidene) (tricyclohexyl phosphine) ruthenium dichloride, (t-butyl vinylidene) (1,3-diisopropyl-4-imidazolin-2-ylidene) (tricyclopentyl phosphine) ruthenium dichloride, bis-(1,3-dicyclohexyl-4-imidazolin-2-ylidene) phenyl vinylidene ruthenium dichloride, etc.

Among these ruthenium carbene complexes, ruthenium complex compounds containing, as a ligand, substituted-imidazolin-2-ylidene whose 4 and 5 positions are substituted by halogen atoms are preferred.

These compounds may be used alone, or may be used in combination of two or more thereof. The amount of the metathesis polymerization catalyst, as expressed in molar ratio of (transition metal atoms in catalyst):(cycloolefin monomer), ranges usually from 1:2,000 to 1:2,000,000, preferably from 1:5,000 to 1:1,000,000, and more preferably from 1:10,000 to 1:500,000.

The metathesis polymerization catalyst may be used with an activator. An activator is added for purposes of controlling polymerization activity and improving the rate of polymerization reaction. Examples of activator include alkylated compounds, halogenated compounds, alkoxylated compounds, and aryloxylated compounds or the like of aluminum, scandium, and tin.

When an activator is used, the amount used thereof, as expressed in molar ratio of (metal atoms in metathesis polymerization catalyst:activator), ranges usually from 1:0.05 to 1:100, preferably from 1:0.2 to 1:20, and more preferably from 1:0.5 to 1:10.

Also, when a complex of transition metal atom of 5th group and 6th group is used as the metathesis polymerization catalyst, both the metathesis polymerization catalyst and the activator are preferably dissolved in the cycloolefin monomer for use, but may be suspended or dissolved in a small amount of solvent for use as long as the properties of the product are not essentially degraded.

When the polymerizable monomer is an acrylate compound, examples of the polymerization catalyst include radical generators, cationic polymerization initiators, anionic polymerization initiators, etc., and radical generators are preferred.

When the polymerizable monomer is a styrene-type monomer, examples of the polymerization catalyst include radical generators, cationic polymerization initiators, anionic polymerization initiators, metallocene catalysts, phenoxy-imine catalysts, etc., and radical generators, metallocene catalysts, and phenoxy-imine catalysts are preferred, radical generators are more preferred.

For the radical generator that functions as a polymerization catalyst for acrylate compounds and styrene-type monomers, a publicly known substance can be used. For example, persulfates such as potassium persulfate, sodium persulfate, ammonium persulfate, etc.; hydrogen peroxide; organic peroxide such as lauroyl peroxide, bensoyl peroxide, di-2-ethylhexyl peroxydicarbonate, t-butyl hydroperoxide, t-butyl peroxypivalate, cyclohexanon peroxide, cumene hydroperoxide, etc.; and the like may be used individually or as a mixture thereof, or may be used in combination with a reducing agent such as acidic sodium sulfite, sodium thiosulfate, ascorbic acid, etc. for use as a redox system. Additionally, azo compounds such as 2,2'-azo-bis-isobutylnitrile, 2,2'-azo-bis-(2,4-dimethyl valeronitrile), 2,2'-azo-bis-(4-methoxy-2,4-dimethyl valeronitrile), dimethyl 2,2'-azo-bis-isobutylate, 4,4'-azo-bis-(4-cyanopentanoic acid), etc.; amidine compounds such as 2,2'-azo-bis-(2-aminodipropane)dihydrochloride, 2,2'-azo-bis-(N,N'-dimethylene isobutyl amidine), 2,2'-azo-bis-(N,N'-dimethylene isobutyl amidine)dihydrochloride, etc.; and the like may also be used.

Among these, one having a one-minute half-life temperature of 150° C. or lower is preferred, and one having a one-minute half-life temperature of 130° C. or lower is more preferred. Note that, in the present invention, the term "one-minute half-life temperature" represents a temperature at which the amount of a radical generator is reduced in half in one minute by decomposition.

The molecular weight of the cyclic olefin polymer used in the present invention is not particularly limited, and may be selected as appropriate depending on the intended use, the weight average molecular weight measured by gel permeation chromatography (in terms of polystyrene, with a toluene eluent) ranges usually from 5,000 to 200,000, and preferably from 80,000 to 150,000.

(Other Components)

In addition to the conjugated diene-based polymer and the cyclic olefin-based polymer described above, a sealing material for secondary battery of the present invention may further contain components such as dispersing agent, ultraviolet (UV) absorber, anti-aging agent, etc. These components are not particularly limited as long as these components do not cause degradation in performance of the insulating gasket described herein later, do not react with electrolyte solution, and are insoluble in electrolyte solution.

Examples of the dispersing agent include anionic compound, cationic compounds, non-ionic compounds, and high-molecular compounds. Among these, a non-ionic compound is preferably used, and among non-ionic compounds, a nonionic surfactant is preferably used. Examples of nonionic surfactant include modified polysiloxane (e.g., POLYFLOW KL100, a production of Kyoeisha Chemical Co., Ltd.), etc. The dispersing agent is selected depending on the types of the electrode active material and of the conducting agent used.

The content ratio of the dispersing agent in the sealing material ranges preferably from 0.01 to 5 wt %, and more preferably from 0.05 to 1 wt %. An excessive content ratio of the dispersing agent will deteriorate electrolyte solution resistance of the resultant sealing material layer when the dispersing agent is used in an organic electrolyte battery. Meanwhile, an insufficient content ratio of the dispersing agent will result in increased surface roughness of the resultant sealing material layer.

Examples of a UV absorber that can be used include, for example, organic substances such as benzotriazole-type UV absorbers, bezoate-type UV absorbers, benzophenone-type UV absorbers, acrylate-type UV absorbers, metal complex-type UV absorbers, salicylic acid ester, etc.; and inorganic substances such as particulate zinc oxide, cerium oxide, titanium oxide, etc. The content ratio of the UV absorber in the sealing material ranges preferably from 0.01 to 2 wt % from a viewpoint of preventing degradation due to ultraviolet light.

Examples of the anti-aging agent include antioxidants, anti-heat aging agents, flex-cracking inhibitor, antiozonant, etc. Among these, antioxidants are preferred because a sealing performance is maintained for a long duration. When the present invention is applied to an organic electrolyte battery, phenol compounds and phosphite ester compounds are more preferred among antioxidants, because these substances function even in a small amount and without adversely affecting the electrolyte solution due to, for example, insolubility in the electrolyte solution.

(Sealing Material for Secondary Battery)

A sealing material for secondary battery according to the present invention contains the conjugated diene-based polymer and the cyclic olefin-based polymer described above, as well as other components as needed. The total amount of the conjugated diene-based polymer and the cyclic olefin-based polymer in the sealing material is 80 wt % or more, preferably 85 wt % or more, and more preferably 90 wt % or more. When the total amount of hydrogenated polymer and the conjugated diene-based polymer is too small, the electrolyte solution resistance and the sealing performance of the resultant sealing material layer are deteriorated.

Also, the weight ratio between the conjugated diene-based polymer and the cyclic olefin-based polymer contained in a sealing material for secondary battery according to the present invention, as expressed in (conjugated diene-based polymer/cyclic olefin-based polymer), ranges from 40/60 to 80/20, preferably from 50/50 to 70/30, and more preferably from 55/45 to 65/35. When the ratio of the conjugated diene-based polymer is excessively large, the heat resistance of the resultant sealing material layer is deteriorated, while when the ratio of the conjugated diene-based polymer is too small, a resultant sealing material layer is hard, and the sealing performance is thus deteriorated.

(Sealing Material Composition)

A sealing material composition for secondary battery according to the present invention contains the conjugated diene-based polymer and the cyclic olefin-based polymer described above, as well as an organic liquid material, and other components blended as needed, and preferably contains the sealing material for secondary battery described above and an organic liquid material.

The organic liquid material is not particularly limited as long as both the conjugated diene-based polymer and the cyclic olefin-based polymer are soluble therein, considering the volatility and fast drying properties, an organic solvent having 5 to 15 carbon atoms is preferred, and an organic solvent having 6 to 12 carbon atoms is more preferred.

Examples of the organic liquid material include: substitutable hydrocarbons such as n-hexane, heptane, n-octane, isooctane, n-nonane, decane, decalin, α-pinene, β-pinene, δ-pinene, 1-chlorooctane, chlorodecane, cyclohexane, cycloheptane, methyl cyclopentane, 2-methyl cyclohexane, 3-methyl cyclohexanone, 4-methyl cyclohexanone, 4-ethyl cyclohexane, chlorocyclohexane, cyclohexene, cycloheptene, benzene, toluene, o-xylene, m-xylene, p-xylene, styrene, chlorobenzene, o-chlorotoluene, m-chlorotoluene, p-chlorotoluene, ethyl benzene, propyl benzene, diisopropenyl benzene, butyl benzene, isobutyl benzene, n-amyl benzene, cumene, etc.; alcohols such as 1-pentanol, 2-pentanol, 3-pentanol, 1-hexanol, 2-hexanol, 3-hexanol, 1-octanol, 2-octanol, benzyl alcohol, 4-t-butyl catechol, cyclopentanol, etc.; ketones such as 2-pentanone, 2-hexanone, 3-hexanone, cyclopentanone, cyclohexanone, cycloheptanone, 2,6-dimethyl-4-heptanone, 4-methyl-2-pentanone, isophorone, etc.; ethers such as propyl ether, butyl ether, isobutyl ether, n-amyl ether, isoamyl ether, methyl n-amyl ether, ethyl butyl ether, ethyl isobutyl ether, ethyl n-amyl ether, ethyl isoamyl ether, etc.; esters such as butyl formate, pentyl formate, isopropyl acetate, n-propyl acetate, n-butyl acetate, s-butyl acetate, t-butyl acetate, ethyl lactate, butyl lactate, methyl benzoate, ethyl benzoate, etc.; amines such as o-toluidine, m-toluidine, p-toluidine, dimethyl aniline, piperidine, etc.; amides such as N-methyl pyrolidone, etc.; sulfur-containing compounds; nitrile group-containing compounds such as adiponitrile etc.; oxygen-containing heterocyclic compounds such as furfural etc.; nitrogen-containing heterocyclic compounds such as pyridine etc.; cellosolve acetates such as ethyl cellosolve acetate; glycols; ethylene glycol alkyl ethers such as diethylene glycol monoethyl ether, diethylene glycol dimethyl ether, diethylene glycol monobutyl ether, triethylene glycol dimethyl ether, etc.; lactones such as γ-valerolactone, γ-caprolactone, etc.; lactams such as δ-valerolactam, etc.; and the like.

The sealing material is contained in an amount of preferably 1 to 30 wt %, and more preferably 5 to 25 wt %, in the organic liquid material.

An additive such as a coloring agent may be further added, as needed, to a sealing material composition for secondary battery of the present invention. A coloring agent that may be added is preferably one that does not react with the electrolyte solution, and is preferably insoluble in the electrolyte solution, examples thereof include various organic and inorganic pigments. Among these, carbon black, and particularly carbon black having a particle size of 0.1 μm or less in diameter, such as furnace black and channel black, is preferred. When such a coloring agent is added, the coloring agent needs to be dissolved or dispersed in the composition in a sufficiently homogeneous manner. When granulated agent or agent having an aggregation structure is used, such agent is preferably dispersed by using a ball mill, a sand mill, ultrasound, or another means. The addition amount of the additive, such as the coloring agent described above, may be any amount as needed, but ranges usually from 0.01 to 20 wt %, preferably from 0.01% by weight to 5% by weight, and more preferably from 0.02 to 3 wt %, relative to the total amount of the conjugated diene-based polymer and the cyclic olefin-based polymer. When the addition amount of the additive is excessively large, flexibility of the sealing material is deteriorated, and thus a crack therein is caused.

Examples of a method for preparing a sealing material composition for secondary battery of the present invention include a method in which a conjugated diene-based polymer and a cyclic olefin-based polymer are kneaded in advance, the resultant mixture is dissolved in an organic liquid material, and then other components such as, for example, dispersing agent are added; a method in which a conjugated diene-based polymer and a cyclic olefin-based polymer are sequentially added to, and then dissolved in, an organic liquid material, and then other components such as, for example, dispersing agent are added; a method in which a solution of a conjugated diene-based polymer and a solution of a cyclic olefin-based polymer are individually prepared, these solutions are mixed together, and then other components such as, for example, dispersing agent are added; and other methods.

(Secondary Battery)

A secondary battery using a sealing material for secondary battery or using a sealing material composition for secondary battery according to the present invention includes a sealing material layer, formed of the sealing material composition described above, provided between an insulating gasket attached to an opening of a metal housing that houses a power generation element and the metal housing, and/or between the insulating gasket and an opening sealing body. The material of the metal housing, the power generation element, and the insulating gasket used in the secondary battery may be those commonly used. The secondary battery has the power generation element thereof housed, and sealed, in the metal housing.

The power generation element includes electrolyte, active materials for the positive electrode and the negative electrode, a separator, and the like. As far as the electrolyte is concerned, an all solid-state battery uses solid electrolyte, while an organic electrolyte battery uses solution of electrolyte (electrolyte solution), which consists of supporting electrolyte and organic electrolyte solvent.

In an organic electrolyte battery, the supporting electrolyte constituting the electrolyte solution contains a compound that tends to be hydrolyzed by reacting with water, such as a lithium compound including, for example, $LiPF_6$, $LiBF_4$, or $LiClO_4$. Examples of an organic electrolyte solvent used include flammable organic compounds such as propylene carbonate (PC), ethylene carbonate (EC), diethyl carbonate (DEC), etc. As far as the insulating gasket is concerned, polyolefin resins such as polyethylene, polypropylene, polypropylene copolymer with ethylene, etc. that are generally said to have a high electrolyte solution resistance are preferably used. Among these, polypropylene copolymer with ethylene is more preferably used for its good combination of strength and elastic modulus. In addition, polyolefin resins are preferably used which have a thermal deformation temperature, measured according to JIS K7207 standard, ranging usually from 90 to 200° C., preferably from 90 to 150° C., and more preferably from 95 to 130° C. A thermal deformation temperature above 200° C. results in an excessive flexural modulus at normal temperatures, and may thus cause deformation upon attachment to the insulating gasket, which may, in turn, cause a crack and a breaking. In contrast, a thermal deformation temperature below 90° C. deteriorates durability of the insulating gasket at high temperatures, and thus deteriorates sealing performance.

The sealing material layer of the secondary battery can be formed, for example, by using the following procedure. First, a predetermined amount of the sealing material composition is supplied onto, and applied on, a surface of the metal housing and/or a surface of the insulating gasket by using a metering pump, such as an air-driven metering dispenser, roller pump, or gear pump. After the application, the surface(s) is/are dried naturally while being maintained in a horizontal position so that the sealing material composition may not be shifted, thereby to allow the organic liquid material to be removed, and to form a thin layer.

Note that, the method for application is not limited to one that uses a metering pump, but the application process may be manually performed using a brush as long as the amount of application is small. Additionally, the drying operation may be performed by forced drying using a heating device instead of natural drying. Forced drying requires a shorter time for drying, and can thus achieve a more suitable process for industrial applications.

For example, a casting process is performed on a base material such as, for example, aluminum foil by using a doctor blade, and the resultant product is heated and dried to obtain a film of sealing material layer. The peel strength between the film and the aluminum foil measured using a 180° peel method is preferably 10 N/25 mm or more.

Also, the surface roughness of the sealing material layer formed, measured according to JIS B 0601 (1994) standard, is preferably 50 μm or less, and more preferably 20 μm or less. An excessively high surface roughness of the sealing material layer deteriorates the sealing performance between the sealing material layer and a surface of the metal housing, and/or between the sealing material layer and a surface of the insulating gasket.

Also, the sealing material layer that may be formed has preferably high peel strength even after heat treatment of a predetermined profile.

The thickness of the sealing material layer formed by the method described above may be arbitrarily selected depending on the sizes of the metal housing and of the insulating gasket, and usually ranges from 0.1 to 1,000 μm. An insufficient thickness may cause problems of electrolyte solution leakage and moisture infiltration, and may cause a split of the layer. In contrast, an excessive thickness may make it difficult to form the layer.

A secondary battery using a sealing material for secondary battery or using a sealing material composition for secondary battery according to the present invention is preferably a lithium ion secondary battery, and the lithium ion secondary battery may be either an organic electrolyte battery or an all solid-state battery.

A sealing material composition for secondary battery according to the present invention can also be suitably used in electric and electronic devices such as an electric field capacitor, an electric double layer capacitor, a lithium ion capacitor, and the like.

EXAMPLES

The present invention will be further described below in the following examples, but the present invention is not limited thereto. Note that, unless otherwise specified, the parts and % in the examples are based on weight. In Examples and Comparative Examples, coating property, peel strength, flexibility, and heat resistance were measured in the following manner.

(Coating Property)

Surface shape (surface roughness Ra) of a film obtained in each of Examples and Comparative Examples was measured according to JIS B 0601 (1994) standard, and is shown in Table 1.

(Peel Strength)

Peel strength between a film of the sealing material obtained in each of Examples and Comparative Examples and the aluminum foil was measured using a 180° peel method. More specifically, an aluminum tape having adhesive thereon was adhered to a test piece that was cut into a 25 mm width ribbon shape, and peel strength was measured by using a tensile tester. Peel strength (N/25 mm) when peeling is generated at an interface between the film of the sealing material and the aluminum foil was measured, and is shown in Table 1.

(Flexibility)

The films obtained in Examples and Comparative Examples were bent so that the films faced outward. Observations were made on the bent portions for cracks, peelings, etc. In Table 1, ○ is set forth when no cracks, peelings, or the like were observed, and x is set forth when a crack, peeling, or the like was observed.

(Heat Resistance)

Heat treatment was performed on each of the films obtained in Examples and Comparative Examples using a heating oven. The heat treatment condition was such that the films were placed in the oven at a temperature of 180° C., and when five minutes elapsed, the temperature of the oven was set so as to rise to 260° C. in 10 minutes. After a predetermined time period elapsed, heating was stopped, and the films were cooled to a room temperature. Peel strength after the treatment was measured, and is shown in Table 1.

Example 1

Polymerization of 1,3-butadiene Polymer

Conjugated Diene-Based Polymer 500 g of toluene and 810 g of butadiene were introduced into a 10 liter autoclave having a stirrer, and were sufficiently stirred, after which 0.27 mol of diethyl aluminum chloride and 0.6 mmol of a complex of pyridine and chromium chloride were added thereto. The mixture were then stirred for 3 hours at a temperature of 60° C. for polymerization. Thereafter, 100 ml of methanol was added to stop the polymerization. After the polymerization stopped, the polymer solution was cooled to a room temperature, and was then taken out. After the obtained polymer solution was steam solidified, it was vacuum dried for 48 hours at 60° C. and 780 g of solid-state polymer was obtained. The molecular weight of the polymer obtained was 390,000, and the glass transition temperature (Tg) was −62° C.

Furthermore, a result of $^{13}$C-NMR spectrum showed that the content of the cis-isomer of this polymer was 94%.

(Production of Cyclic Olefin Polymer)

The content of a 100 ml flask having a stirrer and a three way cock was replaced with nitrogen gas, and 1.2 ml of toluene solution (1.25 mol/dm$^3$) of diethyl aluminum chloride and 7.5 ml of toluene solution (0.01 mol/dm$^3$) of tungsten hexachloride are added thereto, which was stirred for about 5 minutes at a temperature of 0° C. Thereafter, a solution obtained by dissolving 10 g of dicyclopentadiene and 0.1 g of 1-hexene in 24 ml of toluene was added little by little, and was then stirred for 3 hours at a temperature of 0° C. for polymerization. After the polymerization reaction completed, the polymer solution was poured into a large amount of methanol to allow a ring-opened polymer to precipitate. Next, 10 g of the ring-opened polymer obtained was dissolved in 100 ml of toluene to prepare polymer solution of about 10%. This polymer solution was placed in a 1 dm$^3$ autoclave having a stirrer and a thermometer, and 1.7 mg of RuH$_4$[P(C$_6$H$_5$)$_3$]$_4$, produced according to Inorganic Synthesis Vol. 15, was added as a hydrogenation catalyst. After this, hydrogen gas was introduced into the high-pressure autoclave, and the temperature was increased to 165° C. with the polymer solution being stirred. The hydrogen pressure was 60 kgf/cm$^2$. This situation was maintained for 10 hours at this temperature, after which the temperature was allowed to return to a room temperature, and allowed hydrogen gas to be released. In addition, the reaction solution was poured into a large amount of methanol to allow a hydrogenated polymer to precipitate. Thereafter, the resultant was vacuum dried, and thus a yield of 93% of norbornene polymer was obtained. The hydrogenation ratio was 99%. This norbornene polymer had a weight average molecular weight of 103000 in terms of polystyrene, a glass transition temperature (Tg) of 113° C. measured by DSC, a dielectric constant of 2.7 (1 MHz), and a thermal deformation temperature of 95° C.

(Test Piece)

75 parts by weight of the conjugated diene-based polymer and 45 parts by weight of the cyclic olefin polymer obtained as described above, and 0.2 parts by weight of modified polysiloxane (POLYFLOW KL100, a production of Kyoeisha Chemical Co., Ltd.) and 900 parts by weight of an organic solvent (xylene) were mixed together in a flask having a stirring blade while being heated to a temperature of 50° C., thereby to obtain a homogeneous solution. The solution obtained was cast on a sheet of aluminum foil (20 µm thick) by using a doctor blade having a gap of 200 µm. The resultant product is heated and dried for 20 minutes at a temperature of 80° C. to obtain a film.

Example 2

A film was obtained in a similar manner to Example 1 except that 55 parts by weight of the conjugated diene-based polymer and 45 parts of the cyclic olefin polymer were used as the polymers for preparing the test piece.

Example 3

A film was obtained in a similar manner to Example 1 except that 60 parts by weight of the conjugated diene-based polymer and 40 parts of the cyclic olefin polymer were used as the polymers for preparing the test piece.

Example 4

A film was obtained in a similar manner to Example 1 except that the modified polysiloxane was not used for preparing the test piece.

Comparative Example 1

A film was obtained in a similar manner to Example 1 except that 30 parts by weight of the conjugated diene-based polymer and 70 parts of the cyclic olefin polymer were used as the polymers for preparing the test piece.

Comparative Example 2

A film was obtained in a similar manner to Comparative Example 1 except that the modified polysiloxane was not used for preparing the test piece.

Comparative Example 3

A film was obtained in a similar manner to Comparative Example 2 except that 70 parts by weight of asphalt and 20 parts of the cyclic olefin polymer were used instead of the polymers that were used for preparing the test piece.

TABLE 1

|  |  | Ex. 1 | Ex. 2 | Ex. 3 | Ex. 4 | Comp. Ex. 1 | Comp. Ex. 2 | Comp. Ex. 3 |
|---|---|---|---|---|---|---|---|---|
| Polymer etc. | Diene-based Polymer | 75 | 55 | 60 | 75 | 30 | 30 | — |
|  | Cyclic Olefin-based Polymer | 25 | 45 | 40 | 25 | 70 | 70 | 20 |
|  | Other Components | — | — | — | — | — | — | Asphalt 70 |
| Dispersing Agent (POLYFLOW KL100) |  | 0.2 | 0.2 | 0.2 | 0 | 0.2 | 0 | 0 |
| Evaluation Items | Coating Property Ra (μm) | 15 | 15 | 15 | 18 | 15 | 20 | 20 |
|  | Peel Strength (N/25 mm) | 8.2 | 10.2 | 9 | 7.5 | 0.5 | 0.5 | 12 |
|  | Flexibility | ○ | ○ | ○ | ○ | x | x | ○ |
|  | Heat Resistance (N/25 mm) | 6.5 | 6.4 | 6 | 6.4 | — | — | 1.2 |

As shown in Table 1, use of a sealing material composition containing a conjugated diene-based polymer and a cyclic olefin-based polymer, wherein the weight ratio of the conjugated diene-based polymer to the cyclic olefin-based polymer ranges from 50/50 to 80/20, and the total amount of the diene-based polymer and the cyclic olefin-based polymer is 80 wt % or more of the entire amount, exhibited good coating property, peel strength, flexibility, and heat resistance.

In contrast, the weight ratio of the conjugated diene-based polymer to the cyclic olefin-based polymer that was not within the range described above (Comparative Examples 1 and 2) resulted in significantly poor peel strength and flexibility, and heat resistance was not evaluated. Furthermore, the test piece not containing a cyclic olefin-based polymer (Comparative Example 3) exhibited poor heat resistance.

The invention claimed is:

1. A sealing material for a secondary battery comprising:
    a conjugated diene-based polymer;
    a cyclic olefin-based polymer; and
    a nonionic surfactant, wherein
    a glass transition temperature of the conjugated diene-based polymer is −30° C. or lower,
    a thermal deformation temperature of the cyclic olefin-based polymer is 80° C. or higher,
    a weight ratio between the conjugated diene-based polymer and the cyclic olefin-based polymer, as expressed in (conjugated diene-based polymer/cyclic olefin-based polymer), ranges from 40/60 to 80/20, and
    a total amount of the diene-based polymer and the cyclic olefin-based polymer is 80 wt % or more of an entire amount.

2. The sealing material for a secondary battery according to claim 1, wherein the cyclic olefin-based polymer is a polymer obtained by metathesis polymerization, and has a cyclic structure in a main chain.

3. A sealing material composition for a secondary battery comprising:
    the sealing material for secondary battery according to claim 1; and
    an organic liquid material, wherein
    the sealing material for secondary battery is contained in an amount of 1 to 30 wt % relative to the organic liquid material.

4. A sealing material composition for a secondary battery comprising:
    the sealing material for secondary battery according to claim 2; and
    an organic liquid material, wherein
    the sealing material for secondary battery is contained in an amount of 1 to 30 wt % relative to the organic liquid material.

* * * * *